(12) United States Patent  (10) Patent No.: US 8,542,319 B1
Faroudja  (45) Date of Patent: Sep. 24, 2013

(54) INTERLACED VIDEO PRE-PROCESSOR (71) Applicant: Faroudja Enterprises Inc., Los Altos, CA (US)

(72) Inventor: Yves Faroudja, Los Altos, CA (US)

(73) Assignee: Faroudja Enterprises, Inc., Los Altos, CA (US)

( * ) Notice: Subject to any disclaimer, the term of this patent is extended or adjusted under 35 U.S.C. 154(b) by 0 days.

(21) Appl. No.: 13/787,415

(22) Filed: Mar. 6, 2013

Related U.S. Application Data

(60) Provisional application No. 61/734,783, filed on Dec. 7, 2012.

(51) Int. Cl.
*H04N 7/01* (2006.01)
(52) U.S. Cl.
USPC .......................... 348/446; 348/452; 348/459

(58) Field of Classification Search
USPC .................. 348/446, 441, 451, 452, 448, 458, 348/459
IPC .............................................. H04N 7/01, 11/20
See application file for complete search history.

(56) References Cited

U.S. PATENT DOCUMENTS 6,108,041 A * 8/2000 Faroudja et al. .............. 348/446

* cited by examiner

*Primary Examiner* — Sherrie Hsia
(74) *Attorney, Agent, or Firm* — Convergent Law Group LLP (57) ABSTRACT

Methods and systems for pre-processing a progressive scan signal comprise: receiving by a processor thea progressive scan signal; detecting an amount of vertical motion present in the progressive scan signal; low pass filtering the progressive scan signal in a vertical domain as a function of the amount of vertical motion present to generate a pre-filtered progressive signal; and interlacing the pre-filtered progressive signal to generate an interlaced signal having a minimal amount of artifacts.

27 Claims, 8 Drawing Sheets

Adaptive Vertical Low-Pass Filter 120

INTERLACED VIDEO PRE-PROCESSOR

CROSS-REFERENCE TO RELATED APPLICATIONS

This application claims the benefit of provisional Patent Application Ser. No. 61/734,783, filed Dec. 7, 2012, assigned to the assignee of the present application, and incorporated herein by reference.

BACKGROUND

In progressive video scanning, successive scanning lines are vertically aligned from frame to frame. For example, in the 1080p/60 standard (1080 scanning lines per frame, 60 frames per second) line 1 of frame 2 is scanned at the same vertical location as is line 1 of frame 1, and so are lines 1 of frames 3, 4, etc.

An interlaced signal comprises a succession of even and odd fields, 2 successive fields making a frame. For example, in the 1080i/60 standard (1080 lines interlaced, 60 fields per second), each field is composed of 540 lines, and there are 60 fields or 30 frames per second. A frame comprises 1 even field and one odd field in succession. For interlaced video, line 1 of field 2 will be vertically located between line 1 and line 2 of field 1, and so will be line 1 of field 4, while line 1 of field 3 will be vertically co-incident with line 1 of field 1.

Interlaced video has been used since the early days of television, and has been slowly fallen into disfavor, and replaced by progressive scan for more and more applications, mostly because of the specific needs of computer or computer-like displays. More recent television displays such as LCDs or DLPs, can only be driven with a progressive scan. In these cases, interlaced signals have to be de-interlaced, which is costly and difficult.

The main advantage of interlaced signals is a reduction of the bandwidth requirements for a given resolution. The main inconvenience is the introduction of artifacts, which are particularly disturbing if the display de-interlacing process is mediocre or nonexistent. Examples types of artifacts may include inter-line tweeter or flicker, combing effects with motion, and potential field-to-field flicker.

It is desirable, therefore, to provide improved methods and systems of processing interlaced video that reduces the presence of artifacts.

BRIEF SUMMARY

Exemplary embodiments provide methods and systems for pre-processing a progressive scan signal. Aspects of the exemplary embodiments include: receiving by a processor the progressive scan signal; detecting an amount of vertical motion present in the progressive scan signal; low pass filtering the progressive scan signal in a vertical domain as a function of the amount of vertical motion present to generate a pre-filtered progressive signal; and interlacing the pre-filtered progressive signal to generate an interlaced signal having a minimal amount of artifacts.

DETAILED DESCRIPTION

The exemplary embodiments relate to method for pre-processing a progressive scan signal with an interlaced video preprocessor. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments relate to methods and systems for pre-processing a progressive scan signal with an interlaced video preprocessor to generate interlaced signals having minimal artifacts.

The exemplary embodiments recognize that the presence of artifacts in video interlace signals is in great part due to a non-respect of the Nyquist theorem during the video acquisition process. The Nyquist theorem is a formula for reconstructing an original function from its samples. In general, the Nyquist theorem provides that bandlimited function can be reconstructed from an infinite sequence of samples if the bandlimit is no greater than ½ the sampling rate (samples per second). Stated another way, a bandlimited signal can be fully reconstructed from its samples, provided that the sampling rate exceeds twice the maximum frequency in the bandlimited signal. This minimum sampling frequency is called the Nyquist rate. When details of the signal have a higher frequency than the scanning rate (i.e, the bandlimit is too high or there is no bandlimit), reconstruction will exhibit artifacts. The exemplary embodiments pre-process progressive scan signals in a manner that respects the Nyquist theorem in order to generate interlaced signals having minimal artifacts.

Figure 1A:
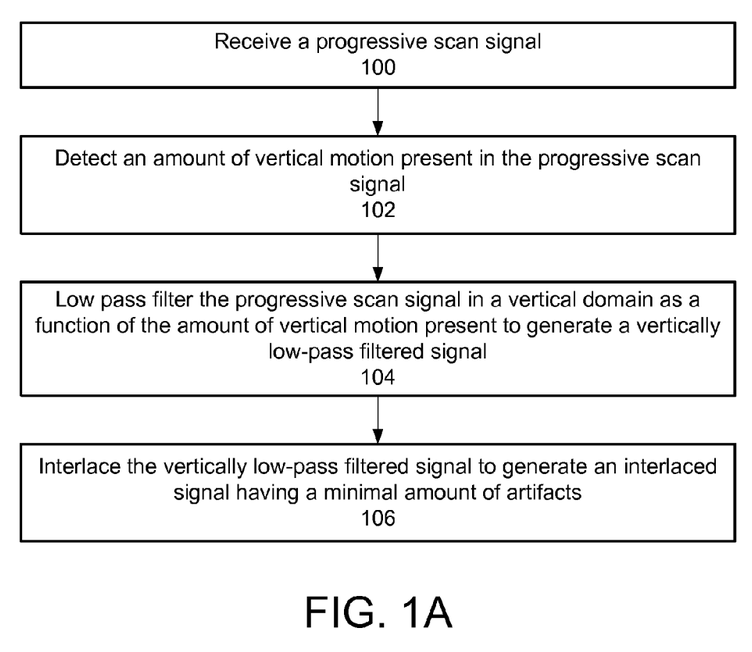
FIG. 1A is a flow diagram illustrating a process for pre-processing a progressive scan signal into an interlaced signal having minimal artifacts.

FIG. 1A is a flow diagram illustrating a process for pre-processing a progressive scan signal into an interlaced signal having minimal artifacts. In one embodiment, the process begins by a pre-processor receiving a progressive scan signal (Block 100). In this embodiment, the progressive scan signal may be generated using a predefined sampling frequency. Receiving the progressive scan signal may include generating the progressive scan signal at a source, such as a camera, or retrieving a previously captured progressive scan signal from a storage medium. Next, an amount of vertical motion is detected in the progressive scan signal (Block 102).

The progressive scan signal is low pass filtered in a vertical domain as a function of the amount of vertical motion present to generate a pre-filtered progressive signal (Block 104). In one embodiment the low pass filtering is performed approximately one scan line in height and only in the vertical domain when vertical motion is present, but in alternative embodiments the low pass filtering could be performed across multiple scan lines. In one embodiment, the progressive scan signal may be processed using a motion adaptive vertical low-pass filter.

The pre-filtered progressive signal is then interlaced to generate an interlaced signal having a minimal amount of artifacts (Block 106). In one embodiment, the low pass filtered signal may be interlaced by eliminating even lines in odd fields, and eliminated odd lines in even fields. In one embodiment, the interlaced signal may then be saved to a storage medium and/or transmitted to the receiver for deinterlacing.

The above exemplary embodiment creates an interlaced signal from a progressive signal that respects the Nyquist sampling theorem during the interlacing process to significantly reduce the presence of artifacts. The process minimizes artifacts by low pass filtering a progressive scan signal in the vertical domain when vertical motion is present in the progressive the signal. If there is no vertical motion, then a preprocessor or receiver can interlace the progressive scan signal normally without artifacts. If vertical motion is present in the progressive scan signal, then the process low pass filters the progressive signal in the vertical domain so that successive fields are closely related. Due to the preprocessing of the progressive scan signal in the presence of vertical motion, the resulting interlaced signal exhibits substantially no vertical frequency components higher than one half of the scanning frequency of the interlaced signal.

Although the pre-processing process may introduce blurring and some loss of information in the interlaced signal, such a loss should be reasonably small and outweighed by the benefits of the significantly reduced amount of artifacts.

Figure 1B:
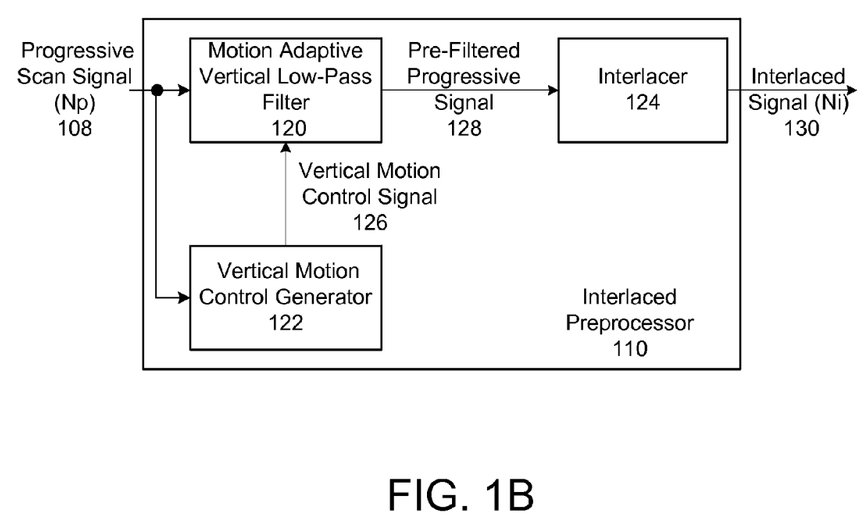
FIG. 1B is a block diagram of an embodiment of a preprocessor for implementing the process described in FIG. 1A.

FIG. 1B is a block diagram of an embodiment of a preprocessor for implementing the process described in FIG. 1A. The interlaced preprocessor 110 comprises a motion adaptive vertical low pass filter 120, a vertical motion control generator 122, and an interlacer 124. The interlaced preprocessor 110 receives a progressive scan signal (Np) 108, where N is a number of lines per frame, and p stands for progressive, which is input to the motion adaptive vertical low-pass filter 120 and the vertical motion control generator 122. The vertical motion control generator 122 detects an amount of vertical motion in the progressive scan signal 108. The vertical motion control generator 122 outputs a vertical motion control signal 126 whose range of values indicates the amount of vertical motion detected in the progressive scan signal 108 to signal the motion adaptive vertical low-pass filter 120 to initiate the vertical low-pass filter only when vertical motion is detected.

The motion adaptive vertical low-pass filter 120 low-pass filters the progressive scan signal 108 in the vertical domain as a function of the vertical motion control signal 126 to produce a pre-filtered progressive signal 128. The pre-filter progressive signal 128 is input to an interlacer 124, which transforms the pre-filter progressive signal 128 into an artifact-free interlaced signal (Ni) 130.

Figure 2A:
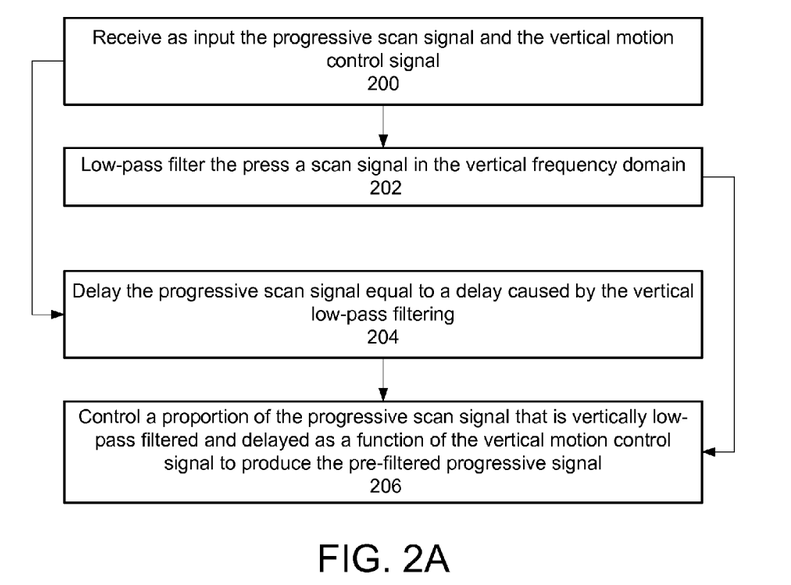
FIG. 2A is a diagram illustrating the process performed by the motion adaptive vertical low-pass filter.

FIG. 2A is a diagram illustrating the process performed by the motion adaptive vertical low-pass filter 120. The motion adaptive vertical low-pass filter 120, which may also referred to as a multidimensional adaptive Nyquist filter, provides a vertically low-pass filtered video signal in the presence of vertical motion and a non-filtered video signal if no vertical motion is present.

Processing of the motion adaptive vertical low-pass filter 120 may begin by receiving as input the progressive scan signal (Np) 108, and the vertical motion control signal 126 output by the vertical motion control generator 122 (block 200). The motion adaptive vertical low-pass filter 120 performs low-pass filtering on the progressive scan signal 108 in the vertical frequency domain only (block 202). The motion adaptive vertical low-pass filter 120 also delays the progressive scan signal 108 equal to a delay caused by the vertical low-pass filtering (block 204). A proportion of the progressive scan signal 108 that is vertically low-pass filtered and delayed is controlled as a function of the vertical motion control signal 126 to produce the pre-filtered progressive signal 128 (block 206).

Figure 2B:
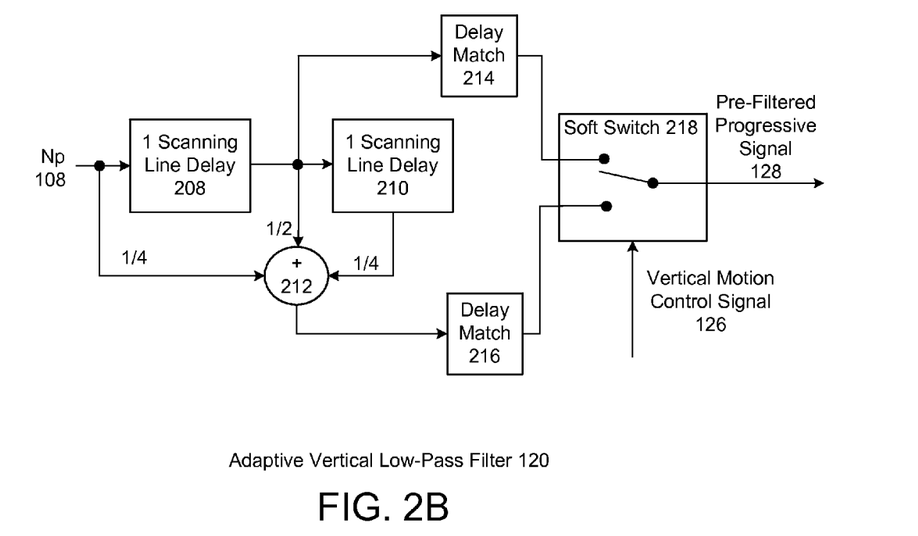
FIG. 2B is a block diagram illustrating an example structure for implementing the process performed by the adaptive vertical low pass filter according to one embodiment.

FIG. 2B is a block diagram illustrating an example structure for implementing the process performed by the adaptive vertical low pass filter according to one embodiment. The motion adaptive vertical low-pass filter 120 may comprise M 1 scanning line delays (where M is an even number, M=2 in this example) 208 and 210, an adder 212, a delay match 214, a delay, and a soft switch 218. The function of the motion adaptive vertical low-pass filter 120 is to adapt the amount of filtering performed on the progressive scan signal 108 in proportion to the amount of motion detected in the progressive scan signal, as indicated by the motion control signal 126.

Accordingly, the two signals at the inputs of the soft switch 218 are the result of the delay of the progressive scan signal 108 by the same amount. One path is delayed by one scanning line delay and delay match 214, and only the signal from that path is transmitted by the soft switch 218 in the absence of vertical motion. The second path is delayed via the vertical low-pass filter (the 1 scanning line delays 208 and 210 and the adder 212) and delay match 216, and only the signal from that path is transmitted by the soft switch 218 and the presence of full vertical motion. A combination of the signals from both paths may be transmitted by the soft switch 218 in intermediate cases of vertical motion (low vertical motion or low-contrast moving objects).

The progressive scan signal (Np) 108 is input to the 1 scanning line delay 208 and to the adder 212 with a coefficient of ¼. Output of the one scanning line delay 208 is Np delayed by 1 line with a coefficient ½, which is input to the one scanning line delay 210, the delay match 214, and to the adder 212. The output of the one scanning line delay 210 is Np delayed by 2 lines with a coefficient ¼, and is input to the adder 212.

The output of the adder 212 is a pre-filtered progressive scan signal, [¼ Np+½ Np(1 line delay)+¼ Np(2 lines delay)], and is input to the delay match 216. The output of the delay match 214 (½ Np(1 line delay)) is also input to the soft switch 218. The delay matches 214 and 216 are required to delay Np to match the delay of the vertical motion control signal 126.

The soft switch 218 is proportionally controlled by the vertical motion control signal 126. The soft switch 218 provides as output a pre-filtered progressive signal 128 that is either 1) unfiltered and simply delayed by 1 line and matching delay if there is no motion, ii) pre-filtered progressive if there is vertical motion, or iii) a combination of both for intermediate cases. FIG. 2B shows only one non-limiting example embodiment of an adaptive vertical low-pass filter.

Figure 3A:
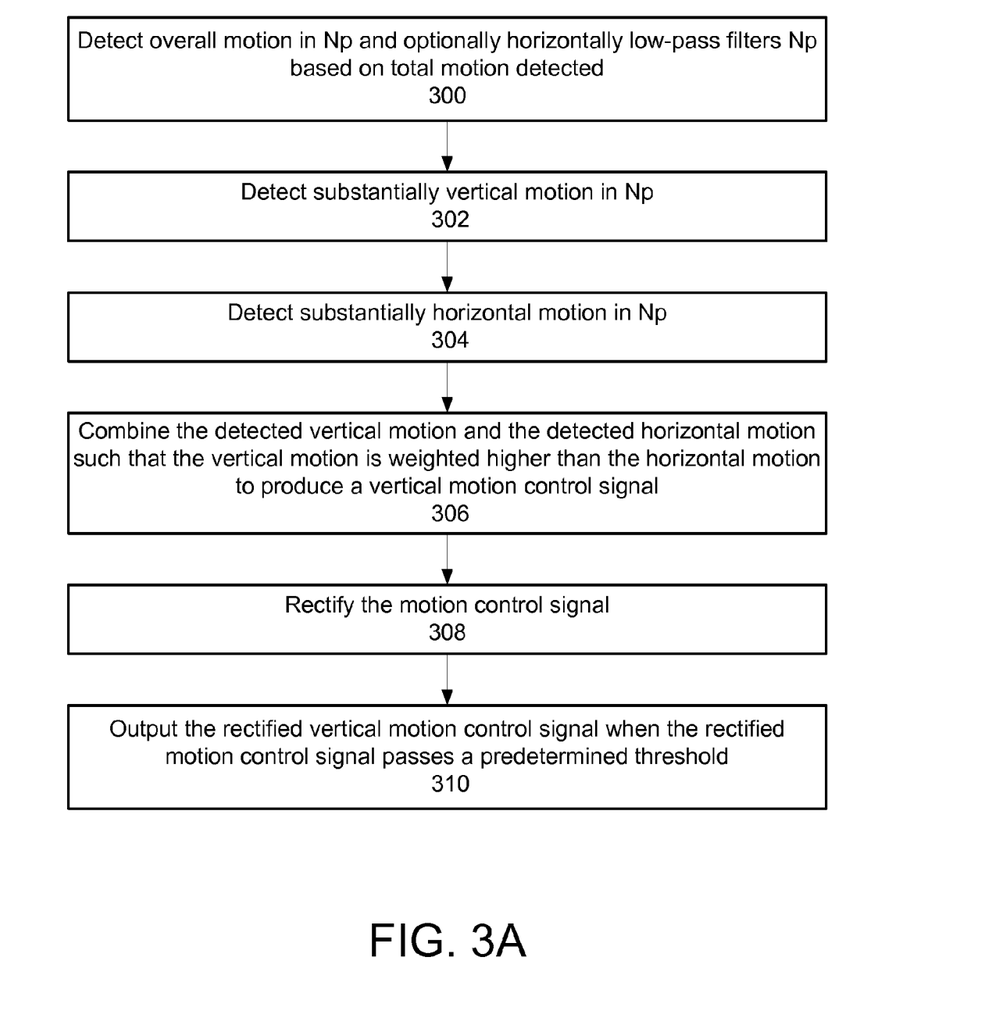
FIG. 3A is a flow diagram of the process performed by the vertical motion control generator of FIG. 1.

FIG. 3A is a flow diagram of the process performed by the vertical motion control generator 122 of FIG. 1. The vertical motion control generator 122 provides a signal that changes filtering of the motion adaptive vertical low-pass filter 120 depending on the amount of detected vertical motion in Np. The vertical motion control generator 122 is configured to compensate for the fact that Np may include not only vertical motion, but also horizontal motion, diagonal motion, and noise.

In response to receiving Np, the vertical motion control generator 122 detects the overall motion in Np and optionally horizontally low-pass filters Np based on total motion detected (block 300). The vertical motion control generator 122 detects substantially vertical motion in Np (block 302) and detects substantially horizontal motion in Np (block 304). The detected vertical motion and the detected horizontal motion are combined such that the vertical motion is weighted higher than horizontal motion to produce a vertical motion control signal (block 306). The vertical motion control signal is rectified (block 308), and then output when the rectified motion control signal passes a predetermined threshold (block 310).

Figure 3B:
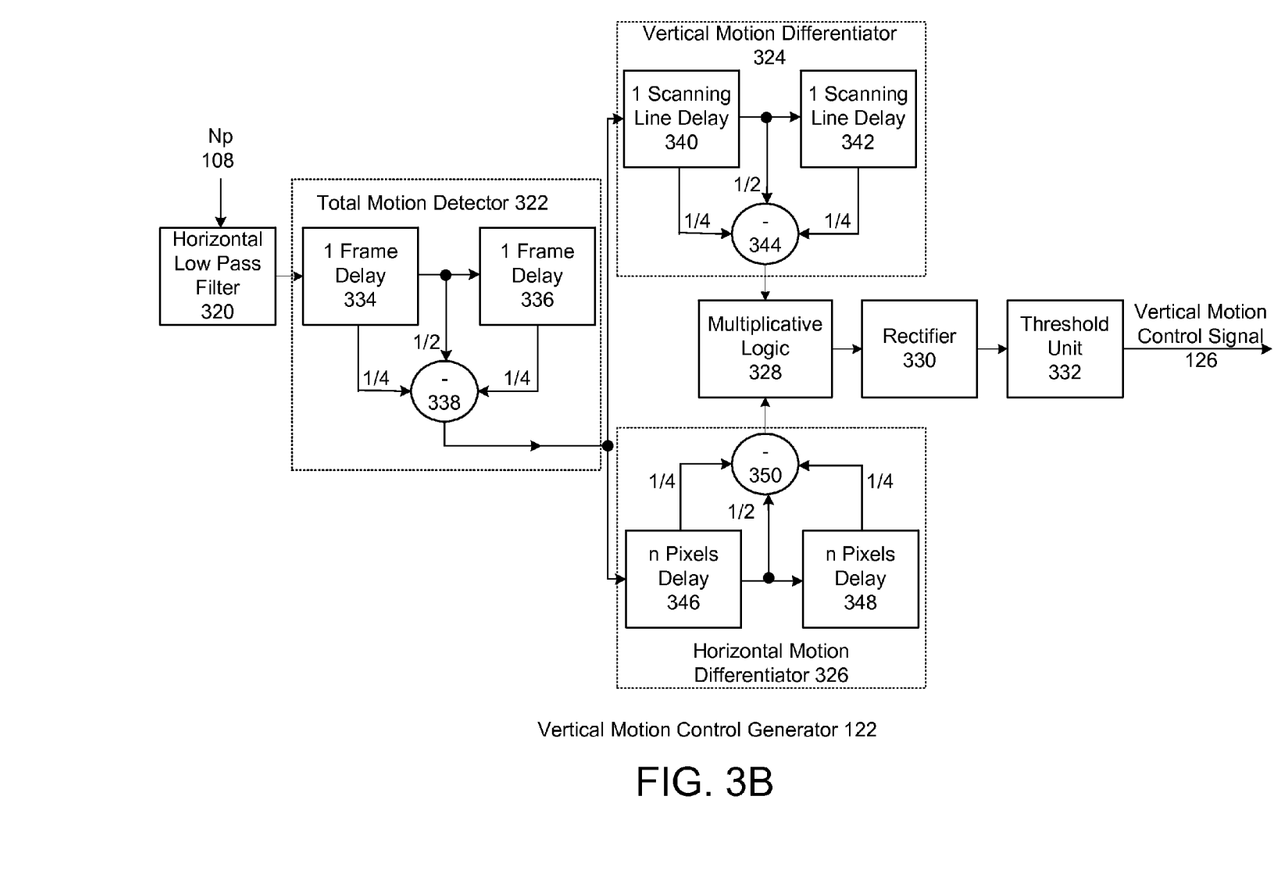
FIG. 3B is a block diagram illustrating an example structure for implementing the process performed by the vertical motion control generator.

FIG. 3B is a block diagram illustrating an example structure for implementing the process performed by the vertical motion control generator 122. In one embodiment, the vertical motion control generator 122 may include a horizontal low-pass filter 320, a total motion detector 322, a vertical motion differentiator 324, a horizontal motion differentiator 326, multiplicative logic 328, a rectifier 330, and a threshold unit 332.

The function of the horizontal low pass filter 320 is to improve the signal-to-noise ratio of Np 108. The horizontal low pass filter 320 detects motion between pixels in Np 108 to reduce noise and the impact of sudden motion events that are not real and due to some parasitic origin. In another embodiment, the horizontal low pass filter 320 could be placed/performed after the total motion detector 322.

The total motion detector 322 may comprise two one-frame delay units 334 and 336 and a subtracter 338 that functions as a differentiator. The output of the total motion detector 322 is a signal that represents total motion, horizontal and vertical, detected in Np and is equal to zero in absence of motion and random noise. The total motion detector 322 compares three successive frames, one frame previous to the current frame, one frame subsequent to the current frame, and the current frame to compute a difference in motion detected between the center frame and the sum of the two outer frames.

The first one-frame delay unit 334 outputs two signals to the subtracter 338; a non-delayed Np and a one frame delay of Np 108. The one frame delay of Np 108 is input to the second one frame delay 336, which outputs two frame delay the subtracter 338. If there is no motion and the coefficients the three frames are equal, that is the sum of the coefficients of the previous frame and subsequent frame are equal to the coefficient for the current frame, then the output of the subtracter 338 will be zero. The output from the subtracter 338 is a motion difference signal that represents a difference between successive frames of unprocessed motion, whether, horizontal, vertical, or diagonal. In another embodiment, the coefficients of the three frames may be treated as negative and input to an adder, rather than a subtracter, with the same effect.

The vertical motion differentiator 324 receives the motion difference signal and measures substantially vertical motion. The vertical motion differentiator 324 may comprise two 1 scanning line delays 340 and 342, and a subtracter 344. The vertical motion differentiator 324 outputs a vertical difference signal, which may include substantially vertical motion with residues of horizontal motion and noise.

The horizontal motion differentiator 326 receives the motion difference signal and measures substantially horizontal motion. The horizontal motion differentiator 326 may comprise two n pixels (n being between 1 and 5) delay units, and a subtracter 350. The output of the substantially horizontal motion differentiator 326 is a horizontal difference signal, which may include substantially horizontal motion with residues of vertical motion and noise.

The multiplicative logic 328 comprises multiplier logic that receives the vertical difference signal and the horizontal difference signal and modulates the two signals in a semi-linear way depending on the signal's amplitude and duration to output a vertical motion control signal. That is, the multiplier multiplies the vertical difference signal by "not" the horizontal difference signal.

When the horizontal difference signal is close to zero, the horizontal difference signal may slightly reduce the amplitude of the vertical difference signal. When the horizontal difference signal is of moderate amplitude, the horizontal difference signal may significantly attenuate the vertical difference signal. When the signal from substantially horizontal difference signal is of high amplitude, the vertical motion control signal may not be output. This approach only works when there is a significant difference between vertical and horizontal motion in Np. The vertical motion control signal from the multiplicative logic 328 is representative of vertical only motion and noise.

The rectifier 330 rectifies the vertical motion control signal, and outputs the motion control signal to the threshold unit 332. The threshold unit 332 outputs the vertical motion control signal 126 if the amplitude of the rectified motion control signal passes a predetermined threshold to eliminate low-level false motion signals due to noise.

Figure 3C:
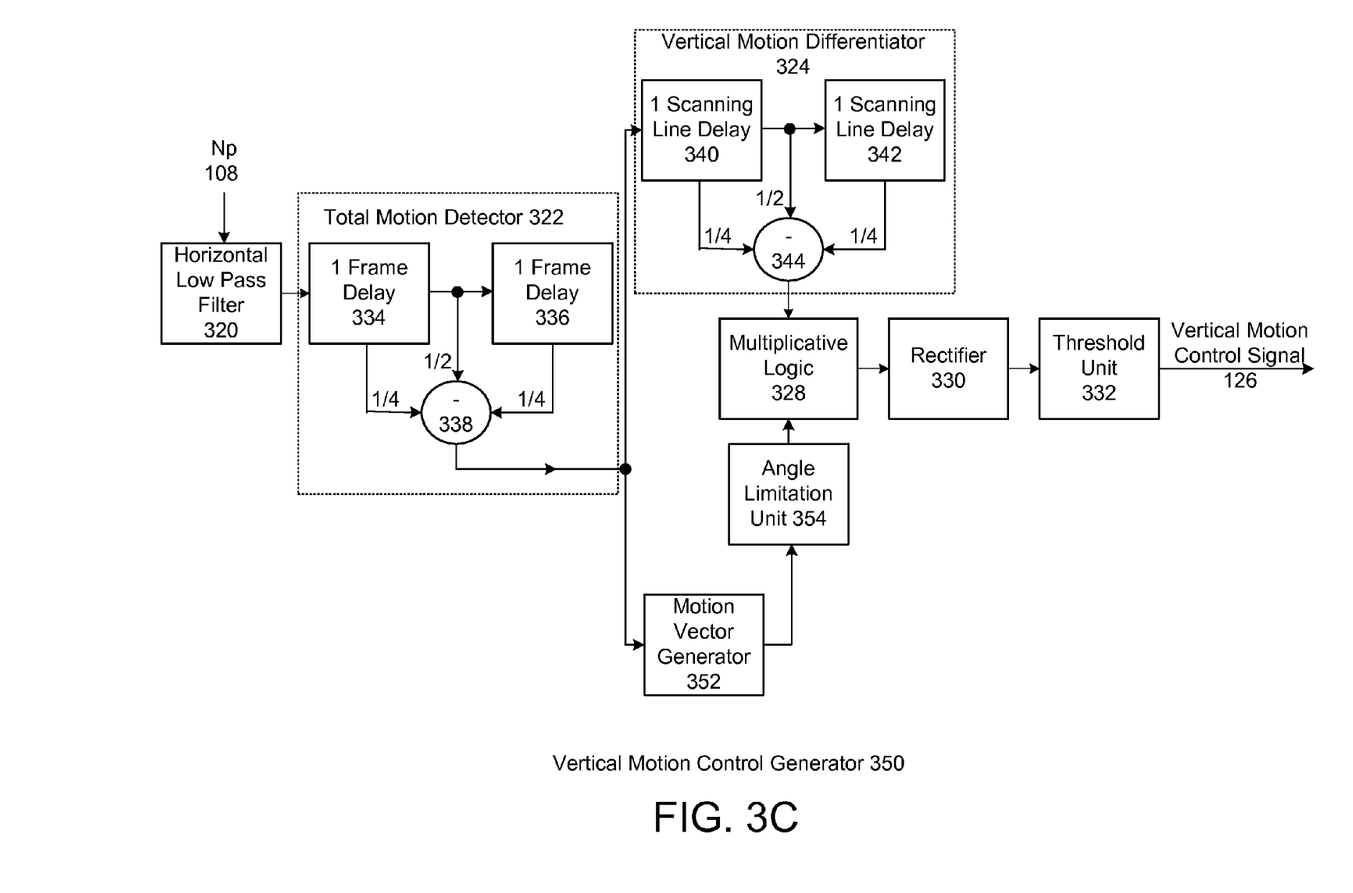
FIG. 3C is a block diagram illustrating an improved embodiment for vertical motion control generator.

FIG. 3C is a block diagram illustrating an improved embodiment for vertical motion control generator, where like components from FIG. 3B have like reference numerals. The vertical motion control generator 350 is similar to that shown in shown in FIG. 3B, but uses a complex vectorial approach that eliminates the horizontal motion differentiator 326 in favor of a motion vector generator 352 and an angle limitation unit 354. The motion vector generator 352 detects an angle of motion and the angle limitation unit 354 reduces an effect of the motion when a substantially horizontal angle of motion is detected, and enhances the effect of the motion when a substantially vertical angle of motion is detected. Thus, the motion vector generator 352 eliminates from the vertical motion control signal 126 all motions comprising substantially horizontal angles, while favoring all motions comprising substantially vertical angles.

The motion vector generator 352 receives the motion difference signal from the total motion detector 322 and generates a motion vector from Np 108 whose angle depends on a direction of the detected motion on a pixel-by-pixel basis or zone-by-zone basis.

The angle limitation unit 354 receives the motion vector and measures the angle of the motion vectors and eliminates mostly horizontal motion vector as determined by a predetermined range of angles, e.g., motion vectors falling between +30° and −30 from horizontal may be eliminated. In this case no motion control signal is output. If the angle of the motion vector is substantially vertical, the motion vector is output to the multiplicative logic 328. When there is no input to the multiplicative logic 320 from the angle limitation unit 354, the vertical motion control signal 126 will be zero, and no vertical low-pass filtering is performed by the adaptive vertical low-pass filter 120

Figure 4A:
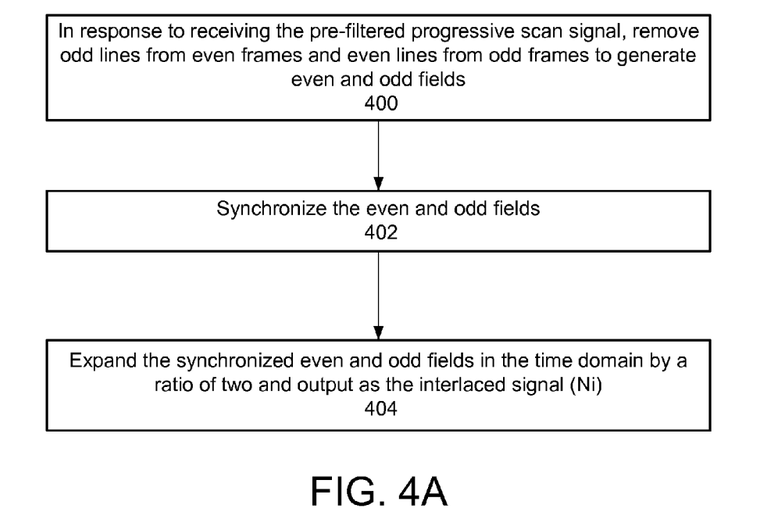
FIG. 4A is a flow diagram illustrating a process performed by the interlacer of FIG. 1.

FIG. 4A is a flow diagram illustrating a process performed by the interlacer of FIG. 1. In response to receiving the pre-filtered progressive signal 128 from the motion adaptive vertical low-pass filter 120, the interlacer 124 removes odd lines from even frames and even lines from odd frames to generate even and odd fields (block 400). In an alternative embodiment, even lines could be removed from even frames and odd lines could be removed from odd frames. The even and odd fields are then synchronized (block 402). The synchronized even and odd fields are then expanded in the time domain by a ratio of two and output as the interlaced signal (Ni) 130 (block 404).

Figure 4B:
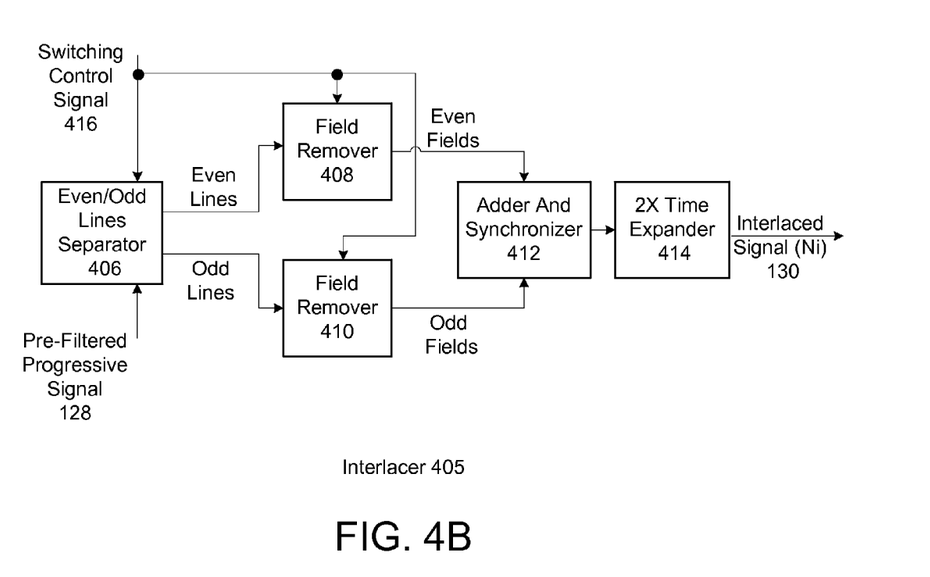
FIGS. 4B and 4C are diagrams illustrating exemplary structures for implementing the process performed by the interlacer shown in FIG. 1.
Figure 4C:
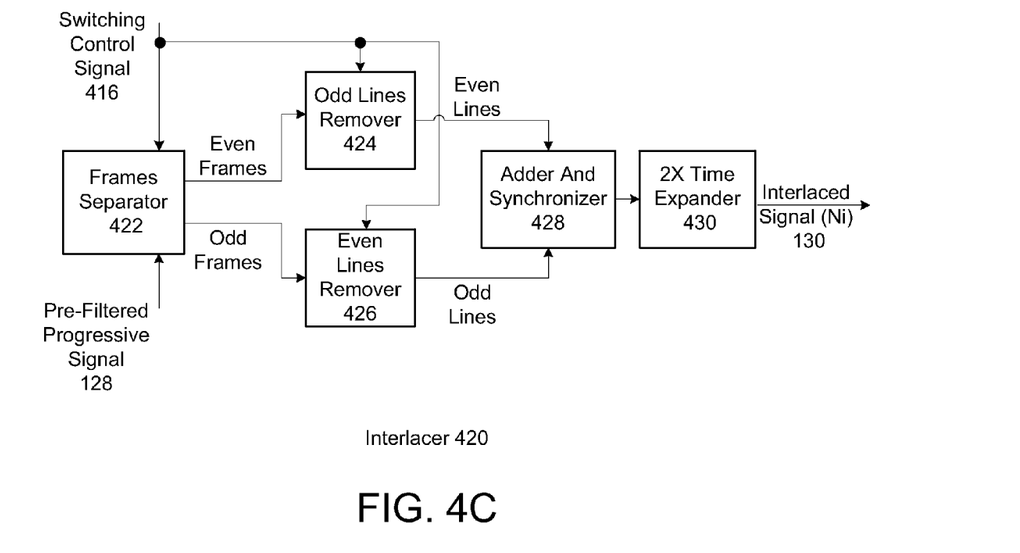

FIGS. 4B and 4C are diagrams illustrating exemplary structures for implementing the process performed by the interlacer 124 shown in FIG. 1. Referring to FIG. 4B, in one embodiment, the interlacer 405 comprises an even/odd lines separator 406, a field remover 408, a field remover 410, an adder and synchronizer 412, and a 2× time expander 414. In this embodiment, the interlacer 405 first separates even/odd lines followed by separating even/odd frames from the pre-filtered progressive signal 128.

The even/odd lines separator 406 receives the pre-filtered progressive scan signal Np 128 and receives a switching control signal 416 that directs even lines to one output, and odd lines to a second output. In one embodiment, the switching control signal 416 may comprise a 2 lines-period square wave.

The field remover 408 receives the even lines and the switching control signal 416 and outputs only even fields separated by an interval of a duration equal to 1 field without signals other than zero. The field remover 410 is identical in structure and functions of field remover 408, but operates on odd lines to deliver odd fields, instead of even lines/field.

The adder and synchronizer 412 adds even and odd fields from the field removers 408 and 410 in a single flow, properly synchronized to output synchronized even and odd fields. The 2× time expander 414 expands the synchronized even and odd fields in the time domain by a ratio of two, doubling, the duration of a scanning line and outputs the interlaced signal Ni 130.

Referring now to FIG. 4C, a second embodiment for an interlacer is shown. The interlacer 420 comprises a frames separator 422, an odd lines remover 424, an even lines remover 426, an adder and synchronizer 428, and a 2× time expander 430. This embodiment is similar to interlacer 405, except the interlacer 420 uses the frames separator 422 to separate even/odd frames from the pre-filtered progressive signal 128 followed by using the odd and even lines removers 424 and 426 to separate even/odd lines, which is in reverse order compared with the interlacer 405.

In a further aspect of the exemplary embodiments, a noise reducer may be inserted between the motion adaptive vertical low-pass filter 120 output and the interlacer 124 shown in FIG. 1B. In this embodiment, noise reduction is performed on the pre-filtered progressive signal 128 and the resulting noise reduced progressive signal is input to the interlace 124.

Figure 5:
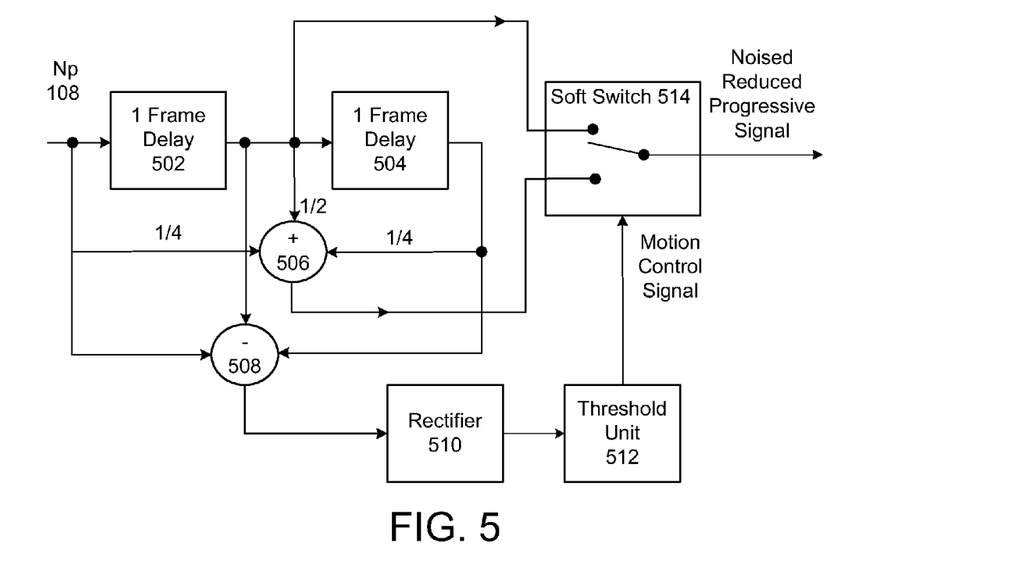
FIG. 5 is a block diagram illustrating one embodiment of a noise reducer.

FIG. 5 is a block diagram illustrating one embodiment of the noise reducer. The noise reducer 500 may comprise a 1 frame delay 502, a 1 frame delay 504, an adder 506, a subtractor 508, a rectifier 510, a threshold unit 512, and a soft switch 514. The noise reducer 500 structure is well-known in the art and will not be described in detail.

Figure 6:
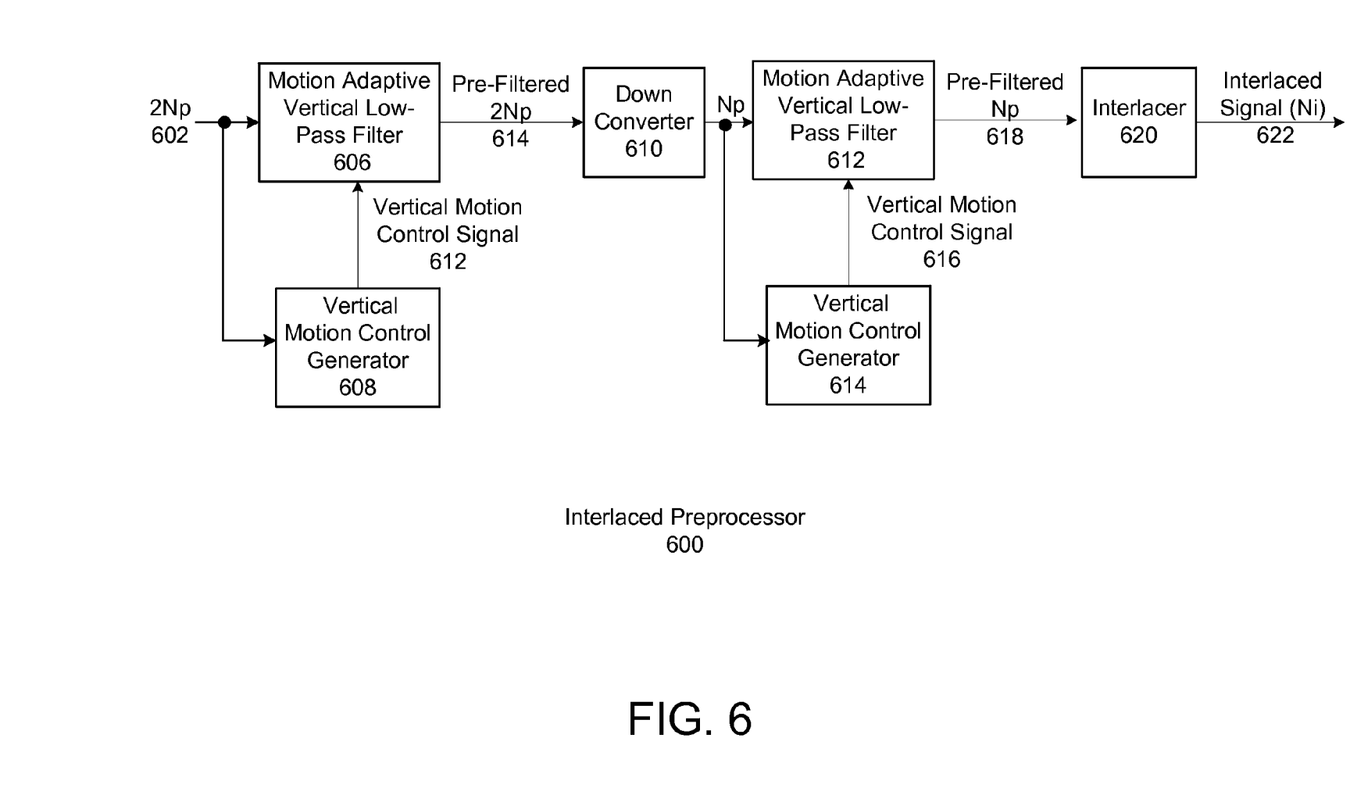
FIG. 6 is a diagram of another embodiment of an interlaced preprocessor.

FIG. 6 is a diagram of another embodiment of an interlaced preprocessor. The interlaced preprocessor 600 is similar to the interlaced preprocessor 110 of FIG. 1B, but input signal 2Np 602 is received at twice the scanning rate of input signal Np of FIG. 1B, and in FIG. 6, the signal Np is obtained by adaptive vertical pre-filtering of the signal 2Np 602 and down conversion.

The interlaced preprocessor 600 comprises a motion adaptive vertical low-pass filter 606, a vertical motion control generator 608, a down converter 610, a motion adaptive vertical low-pass filter 612, a vertical motion control generator 614, and an interlacer 620.

The motion adaptive vertical low-pass filter 606 and the vertical motion control generator 608 are identical to the motion adaptive vertical low-pass filter 120 and the vertical motion control generator 122 of FIG. 1B, and vertically low-pass filter 2Np 602 based on the amount of vertical motion detected to produce a pre-filtered 2Np signal 614.

The down converter 610 down converts the pre-filtered 2Np signal 614 and outputs Np. The motion adaptive vertical low-pass filter 612 and the vertical motion control generator 614 are identical to the motion adaptive vertical low-pass filter 606 and the vertical motion control generator 608 and vertically low-pass filter Np based on the amount of vertical motion detected to produce a pre-filtered Np signal 618. The interlacer 620 interlaces pre-filtered Np signal into an interlaced signal (Ni) 622 having minimal artifacts.

A method and system has been disclosed for pre-processing a progressive scan signal with an interlaced video preprocessor to generate interlaced signals having minimal artifacts. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

I claim:

1. A method for pre-processing a progressive scan signal, the method comprising:
   receiving by a processor the progressive scan signal;
   detecting an amount of vertical motion present in the progressive scan signal;
   low pass filtering the progressive scan signal in a vertical domain as a function of the amount of vertical motion present to generate a pre-filtered progressive signal; and
   interlacing the pre-filtered progressive signal to generate an interlaced signal having a minimal amount of artifacts.

2. The method of claim 1, wherein the interlaced signal exhibits substantially no vertical frequency components higher than one half of the scanning frequency of the interlaced signal in presence of vertical motion.

3. The method of claim 1, wherein the low-pass filtering further comprises:
receiving a vertical motion control signal output by a vertical motion control generator that changes filtering of the motion adaptive vertical low-pass filter depending on the amount of vertical motion detected.

4. The method of claim 3, wherein the vertical motion control generator reduces an effect of the motion when a substantially horizontal angle of motion is detected, and enhances the effect of the motion when a substantially vertical angle of motion is detected.

5. The method of claim 3, wherein the low-pass filtering further comprises:
low-pass filtering the progressive scan signal in the vertical frequency domain only;
delaying the progressive scan signal equal to a delay caused by the vertical low-pass filtering; and
controlling a proportion of the progressive scan signal that is vertically low-pass filtered and delayed as a function of the vertical motion control signal to produce the pre-filtered progressive signal.

6. The method of claim 3, wherein the vertical motion control signal is generated by:
detecting overall motion in the progressive scan signal and optionally horizontally low-pass filtering the progressive scan signal based on total motion detected;
detecting substantially vertical motion in the progressive scan signal;
detecting substantially horizontal motion in the progressive scan signal;
combining the detected vertical motion and the detected horizontal motion such that the vertical motion is weighted higher than horizontal motion to produce the vertical motion control signal; and
rectifying the vertical motion control signal.

7. The method of claim 1, wherein the interlacing further comprises:
responsive to receiving the pre-filtered progressive scan signal, performing at least one: removing from the pre-filter progressive signal odd lines from even frames and even lines from odd frames to generate even and odd fields; and removing from the pre-filter progressive signal even lines from even frames and odd lines from odd frames;
synchronizing the even and odd fields; and
expanding synchronized even and odd fields in a time domain by a ratio of two and outputting the interlaced signal.

8. The method of claim 7, further comprising: noise reducing the pre-filtered progressive scan signal prior to interlacing.

9. The method of claim 1, further comprising: prior to performing the steps of claim 1, receiving a progressive signal 2Np at twice a scanning rate of the progressive scan signal; adaptive vertical pre-filtering 2Np; and performing down conversion on 2Np to obtain the progressive scan signal.

10. An interlaced pre-processor that processes a progressive scan signal, comprising:
a vertical motion control generator that detects an amount of vertical motion in the progressive scan signal and that outputs a vertical motion control signal indicating an amount of vertical motion detected;
a motion adaptive vertical low pass filter that low-pass filters the progressive scan signal in a vertical domain as a function of the vertical motion control signal to generate a pre-filtered progressive signal; and
an interlacer that interlaces the pre-filtered progressive signal to generate an interlaced signal having a minimal amount of artifacts.

11. The interlaced preprocessor of claim 10, wherein the interlaced signal exhibits substantially no vertical frequency components higher than one half of the scanning frequency of the interlaced signal in presence of vertical motion.

12. The interlaced preprocessor of claim 10, wherein the motion adaptive vertical low pass filter is further configured to:
receive a vertical motion control signal output by a vertical motion control generator that changes filtering of the motion adaptive vertical low-pass filter depending on the amount of vertical motion detected.

13. The interlaced preprocessor of claim 12, wherein the vertical motion control generator reduces an effect of the motion when a substantially horizontal angle of motion is detected, and enhances the effect of the motion when a substantially vertical angle of motion is detected.

14. The interlaced preprocessor of claim 12, wherein the motion adaptive vertical low pass filter is further configured to:
low-pass filter the progressive scan signal in the vertical frequency domain only;
delay the progressive scan signal equal to a delay caused by the vertical low-pass filtering; and
control a proportion of the progressive scan signal that is vertically low-pass filtered and delayed as a function of the vertical motion control signal to produce the pre-filtered progressive signal.

15. The interlaced preprocessor of claim 12, wherein vertical motion control generator is configured to:
detect overall motion in the progressive scan signal and optionally horizontally low-pass filtering the progressive scan signal based on total motion detected;
detect substantially vertical motion in the progressive scan signal;
detect substantially horizontal motion in the progressive scan signal;
combine the detected vertical motion and the detected horizontal motion such that the vertical motion is weighted higher than horizontal motion to produce the vertical motion control signal; and
rectify the vertical motion control signal.

16. The interlaced preprocessor of claim 10, wherein the interlacer is configured to:
responsive to receiving the pre-filtered progressive scan signal, perform at least one: remove from the pre-filter progressive signal odd lines from even frames and even lines from odd frames to generate even and odd fields; and remove from the pre-filter progressive signal even lines from even frames and odd lines from odd frames;
synchronize the even and odd fields; and
expand synchronized even and odd fields in a time domain by a ratio of two and outputting the interlaced signal.

17. The interlaced preprocessor of claim 16, further comprising: a noise reducer that reduces noise of the pre-filtered progressive scan signal prior to interlacing.

18. The interlaced preprocessor of claim 10, wherein the interlaced preprocessor is further configured to receive a progressive signal 2Np at twice a scanning rate of the progressive scan signal; adaptive vertical pre-filter 2Np; and perform down conversion on 2Np to obtain the progressive scan signal.

19. A computer program product stored on a non-transitory computer readable storage medium comprising program instructions for pre-processing a progressive scan signal, the program instructions for:
- receiving by a processor the progressive scan signal;
- detecting an amount of vertical motion present in the progressive scan signal;
- low pass filtering the progressive scan signal in a vertical domain as a function of the amount of vertical motion present to generate a pre-filtered progressive signal; and
- interlacing the pre-filtered progressive signal to generate an interlaced signal having a minimal amount of artifacts.

20. The computer program product of claim 19, wherein the interlaced signal exhibits substantially no vertical frequency components higher than one half of the scanning frequency of the interlaced signal.

21. The computer program product of claim 19, wherein the program instructions for low-pass filtering further comprise program instructions for:
- receiving a vertical motion control signal output by a vertical motion control generator that changes filtering of the motion adaptive vertical low-pass filter depending on the amount of vertical motion detected.

22. The computer program product of claim 21, wherein the vertical motion control generator reduces an effect of the motion when a substantially horizontal angle is detected, and enhances the effect of the motion when a substantially vertical angle is detected.

23. The computer program product of claim 22, wherein the program instructions for low-pass filtering further comprise program instructions for:
- low-pass filtering the progressive scan signal in the vertical frequency domain only;
- delaying the progressive scan signal equal to a delay caused by the vertical low-pass filtering; and
- controlling a proportion of the progressive scan signal that is vertically low-pass filtered and delayed as a function of the vertical motion control signal to produce the pre-filtered progressive signal.

24. The computer program product of claim 22, wherein the vertical motion control signal is generated by:
- detecting overall motion in the progressive scan signal and optionally horizontally low-pass filtering the progressive scan signal based on total motion detected;
- detecting substantially vertical motion in the progressive scan signal;
- detecting substantially horizontal motion in the progressive scan signal;
- combining the detected vertical motion and the detected horizontal motion such that the vertical motion is weighted higher than horizontal motion to produce the vertical motion control signal; and
- rectifying the vertical motion control signal.

25. The computer program product of claim 19, wherein the program instructions for interlacing further comprise program instructions for:
- responsive to receiving the pre-filtered progressive scan signal, performing at least one: removing from the pre-filter progressive signal odd lines from even frames and even lines from odd frames to generate even and odd fields; and removing from the pre-filter progressive signal even lines from even frames and odd lines from odd frames;
- synchronizing the even and odd fields; and
- expanding synchronized even and odd fields in a time domain by a ratio of two and outputting the interlaced signal.

26. The computer program product of claim 25, further comprising program instructions for: noise reducing the pre-filtered progressive scan signal prior to interlacing.

27. The computer program product of claim 19, further comprising program instructions for: prior to performing the program instructions of claim 19, receiving a progressive signal 2Np at twice a scanning rate of the progressive scan signal; adaptive vertical pre-filtering 2Np; and performing down conversion on 2Np to obtain the progressive scan signal.

* * * * *